United States Patent [19]

Hachima

[11] Patent Number: 5,527,453
[45] Date of Patent: Jun. 18, 1996

[54] APPARATUS FOR TREATING DIRTY WATER AERATED BY SOLAR POWERED COMPRESSOR

[76] Inventor: Hiroki Hachima, 11-1, Ichiban-cho, Chiyoda-ku, Tokyo, Japan

[21] Appl. No.: 253,492

[22] Filed: Jun. 3, 1994

[30] Foreign Application Priority Data

Jun. 6, 1993 [JP] Japan ................................ 5-172005
May 26, 1994 [JP] Japan ................................ 6-113109

[51] Int. Cl.⁶ ........................................ C02F 3/06
[52] U.S. Cl. ...................... 210/150; 119/260; 136/291; 210/151; 210/169; 210/221.2
[58] Field of Search ................................ 210/150, 151, 210/169, 406, 416.2, 259, 615, 620, 631, 220, 221.2, 258; 119/260; 136/291

[56] References Cited

U.S. PATENT DOCUMENTS

| | | | |
|---|---|---|---|
| 4,004,551 | 1/1977 | Kato | 119/260 |
| 4,622,148 | 11/1986 | Willinger | 119/260 |
| 5,053,125 | 10/1991 | Willinger et al. | 119/260 |
| 5,106,492 | 4/1992 | Distinti et al. | 210/169 |
| 5,164,089 | 11/1992 | Preston | 210/416.2 |
| 5,176,824 | 1/1993 | Willinger et al. | 210/169 |
| 5,276,924 | 1/1994 | Hachima | 4/111.1 |
| 5,288,400 | 2/1994 | Phillips | 210/169 |

FOREIGN PATENT DOCUMENTS

| | | | |
|---|---|---|---|
| 3516617 | 11/1986 | Germany | 119/260 |
| 2195910 | 4/1988 | United Kingdom | 210/169 |

OTHER PUBLICATIONS

"Solar Photoelectric Electrodialysis Desalination Plant", I. G. Savchenko et al, Applied Solar Energy, vol. 14, No. 3, pp. 45–50, 1978.

*Primary Examiner*—Joseph W. Drodge
*Attorney, Agent, or Firm*—Lorusso & Loud

[57] ABSTRACT

A dirty water treating apparatus includes a container having air permeability in which a porous material is placed. Aerobic bacteria are implanted onto the porous material. Dirty water is passed through the porous material while air is forcibly passed through the porous material from an air compressor powered by a solar generator. The dirty water treating apparatus is placed in an aquarium in which water is circulated. The apparatus continuously cleans waters, thereby providing an environment suitable for fish.

12 Claims, 12 Drawing Sheets

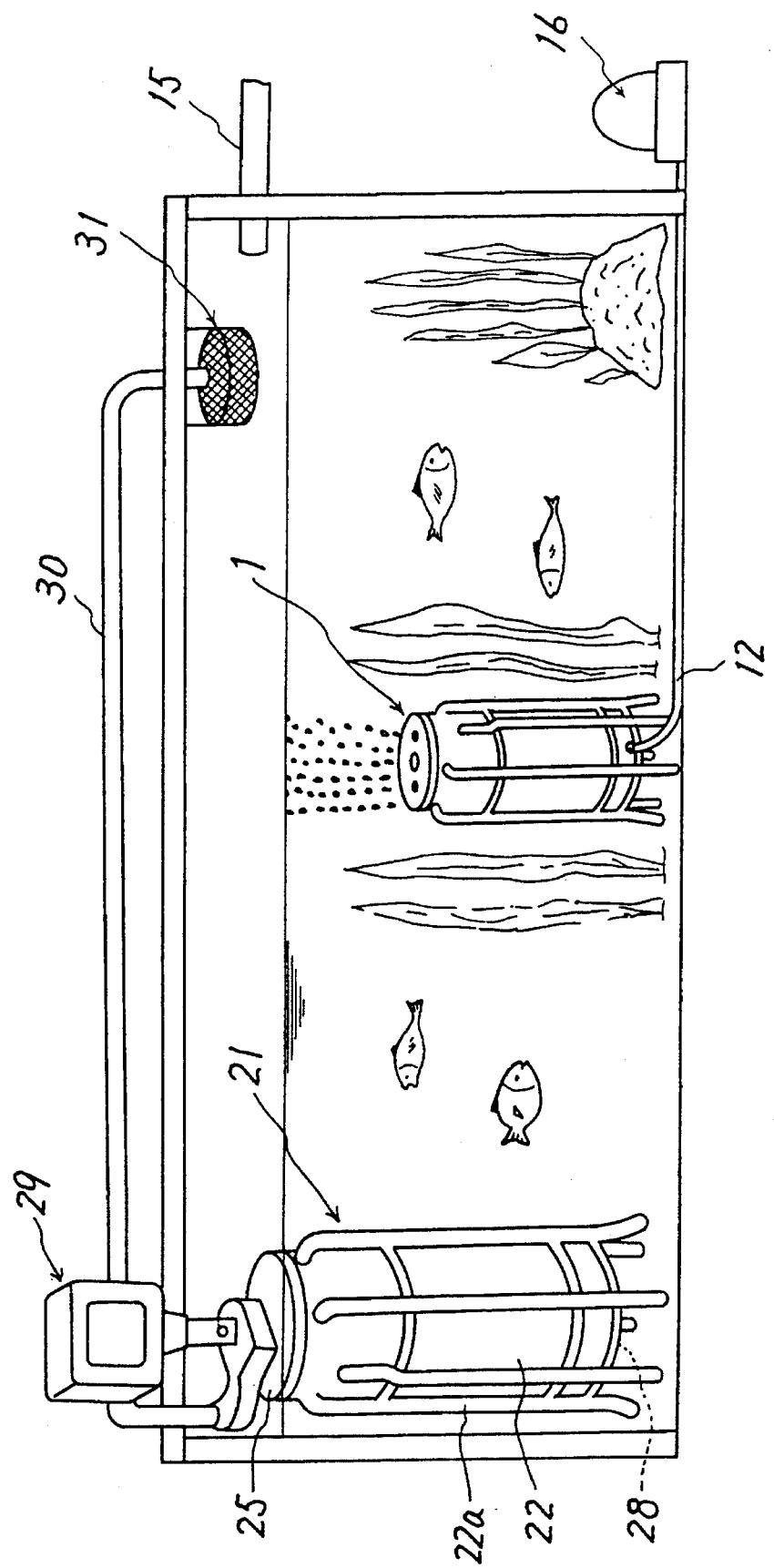

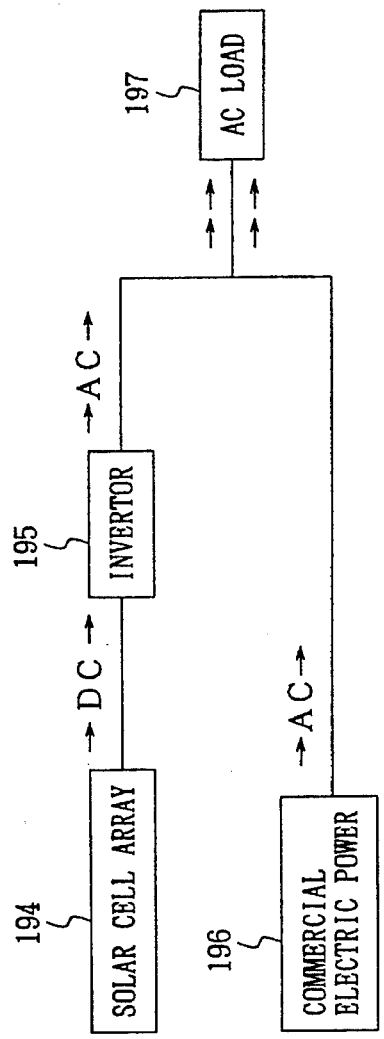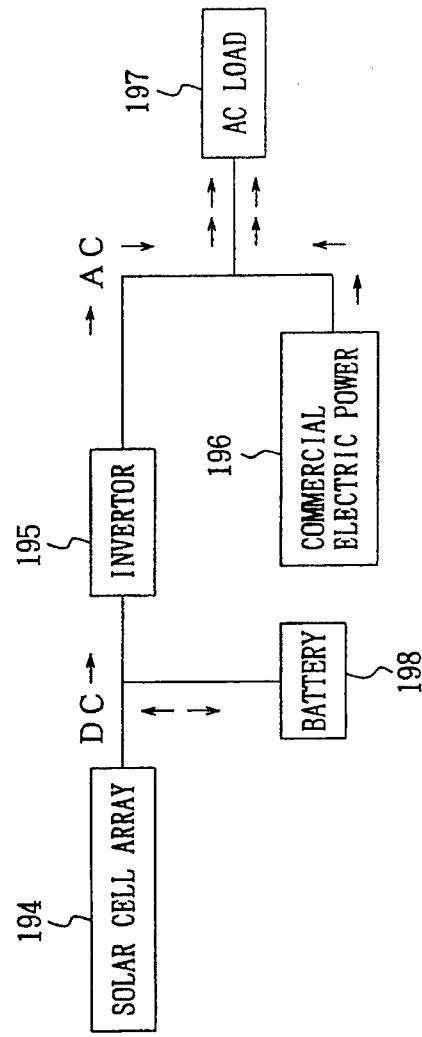

2

APPARATUS FOR TREATING DIRTY WATER AERATED BY SOLAR POWERED COMPRESSOR

BACKGROUND OF THE INVENTION

1. Field of the Invention

The present invention relates to an apparatus and a facility for treating dirty water.

2. Description of the Related Art

Presently, no satisfactory methods have been developed for treating dirty water of aquariums, rivers, lakes and marshes, bays, and home sewage.

In an aquarium tank, a water treatment apparatus such as a filter unit is disposed above the tank and/or at the bottom of the tank. However, fish sometimes die due to deteriorated quality of water caused by food and excretions of fish. Therefore, conventional aquariums require frequent changes of water and careful cleaning techniques.

In large scale water treatment facilities, water is circulated to undergo physical filtration with a fibrous filter, and germs and algae in the water are suppressed (the genes of algae are broken down) by ultraviolet rays and ozone, thereby cleaning the water. Also, containers including activated carbon have been buried in the bottom of a river for cleaning the river water.

Contamination of water in rivers, lakes and marshes in areas functioning as a source for a water supply has created a serious social problem. In areas where algae are excessively produced due to overnourishment of water, mud is contaminated as a result of accumulation and decomposition of chlorellas so that deterioration of water quality has progressed.

In addition, since hygienic flush toilets have been introduced not only in urban areas but also in farming areas, construction and improvement of sewer systems and sewage treatment plants have been demanded. Moreover, deterioration of the natural environment is thought to progress because of inflow of home sewage into rivers in areas where sewer systems and sewage treatment plants are not provided, the habit of disposing of body wastes into the environment together with water, and destruction of the natural water cleaning system.

SUMMARY OF THE INVENTION

An object of the present invention is to provide an improved apparatus and a facility for treating dirty water having an excellent ability of cleaning water and in which treatment of dirty water can be performed more easily with a compact apparatus or facility.

According to a first aspect of the present invention, there is provided a dirty water treating apparatus which includes (a) a container having air permeability, (b) a porous material placed in the container and onto which aerobic bacteria are implanted, (c) dirty water passing means for passing dirty water through the porous material, and (d) air passing means for passing air through the porous material.

In preferred embodiments, the container having air permeability is a cylindrical container, a rectangular container, a net, or a basket.

In preferred embodiments, the air passing means includes an air supply pipe which penetrates the porous material and which is formed with air discharging holes. One end of the air supply pipe is closed, while the other end of the air supply pipe is connected to an air compressor.

A solar generator may be used as a power source for the air compressor.

In preferred embodiments, the porous material is foamed glass, pumice or feldspar.

In the dirty water treating apparatus according to the first aspect of the present invention, treatment of dirty water can be performed more easily with a compact apparatus or facility, while providing excellent water cleaning capability.

In areas where commercial electric power is not available, a solar generator can be used for operating the dirty water treating apparatus.

According to a second aspect of the present invention, there is provided a dirty water treating facility which comprises (a) a first dirty water treating apparatus including a first container immersed in the dirty water and having air permeability, a first porous material placed in the first container and onto which aerobic bacteria are implanted, first dirty water passing means for passing dirty water through the first porous material, and air passing means for passing air through the first porous material; and (b) a second dirty water treating apparatus including a second container having air permeability, a second porous material placed in the second container and onto which aerobic bacteria are implanted, second dirty water passing means for passing dirty water through the second porous material, and a suction pump for circulating the dirty water; and (c) a physical filter for filtering water discharged from the second dirty water treating apparatus.

The water is water in aquariums, sewage, or dirty water in rivers, lakes or marshes.

In the dirty water treating apparatus according to the second aspect of the present invention, treatment of dirty water such as water in aquariums, home sewage, water in rivers, lakes, marshes, and bays can be carried out in a practical manner without using chemical treatment.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which:

FIG. 4 is a view showing the overall structure of a dirty water treating facility in which the dirty water treating apparatus shown in FIG. 1 is used;

FIG. 18 is a block diagram showing a first example of an electrical power generating apparatus with solar cells which is used in the dirty water treating apparatuses according to the present invention; and FIG. 19 is a block diagram showing a second example of an electrical power generating apparatus with solar cells which is used in the dirty water treating apparatuses according to the present invention.

DESCRIPTION OF THE PREFERRED EMBODIMENTS

The present invention will now be described by way of examples with reference to the attached drawings.

First Embodiment

Figure 3:
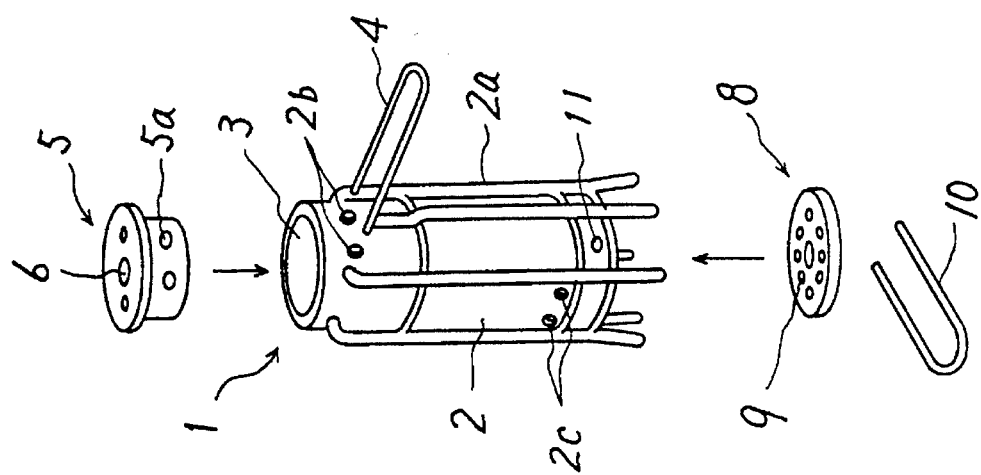
FIG. 3 is an exploded view of the dirty water treating apparatus shown in FIG. 1.
Figure 2:
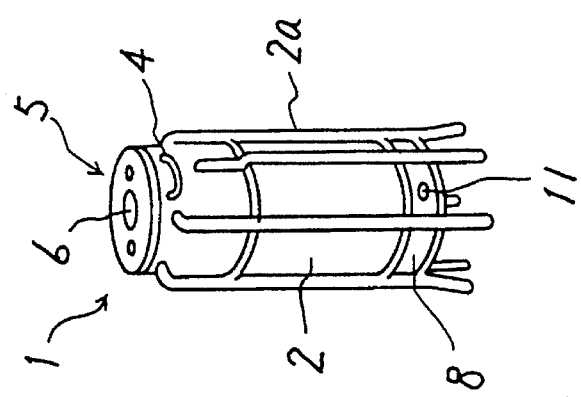
FIG. 2 is an external view of the dirty water treating apparatus shown in FIG. 1.
Figure 1:
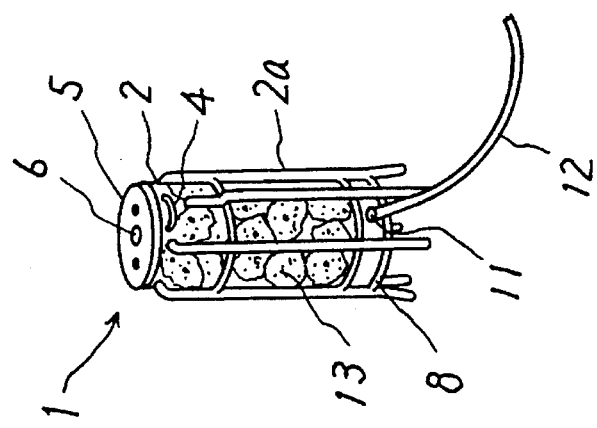
FIG. 1 is a perspective view schematically showing a dirty water treating apparatus according to a first embodiment of the present invention.
Figure 5:
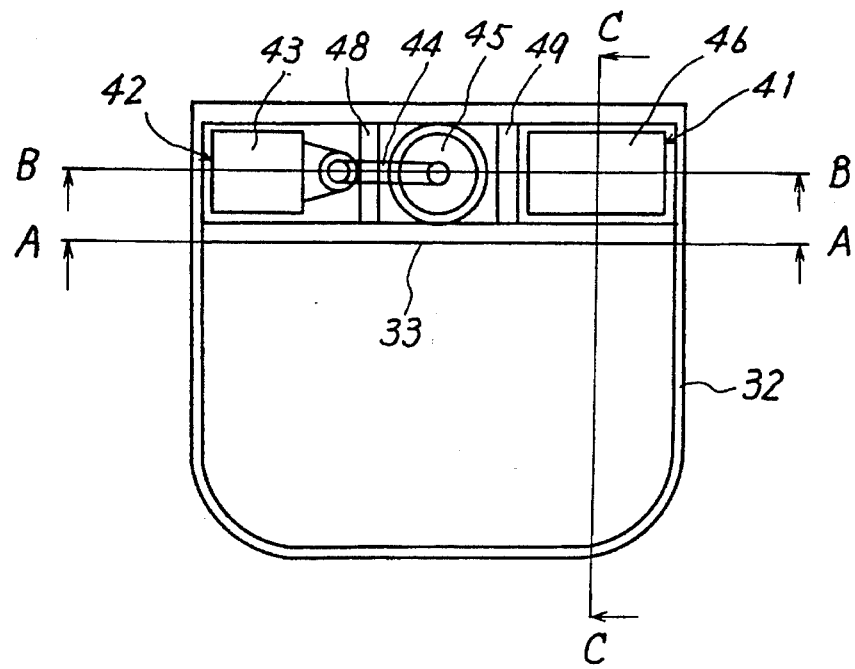
FIG. 5 is a plan view of a dirty water treating facility for an aquarium in which a dirty water treating apparatus according to a second embodiment of the present invention is disposed.
Figure 6:
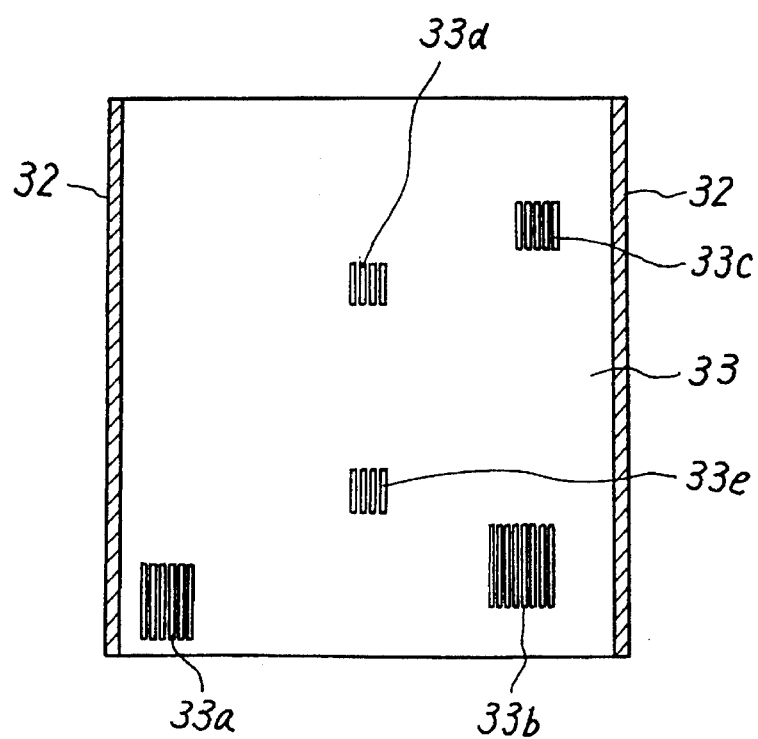
FIG. 6 is a sectional view taken along line A—A in FIG. 5.
Figure 7:
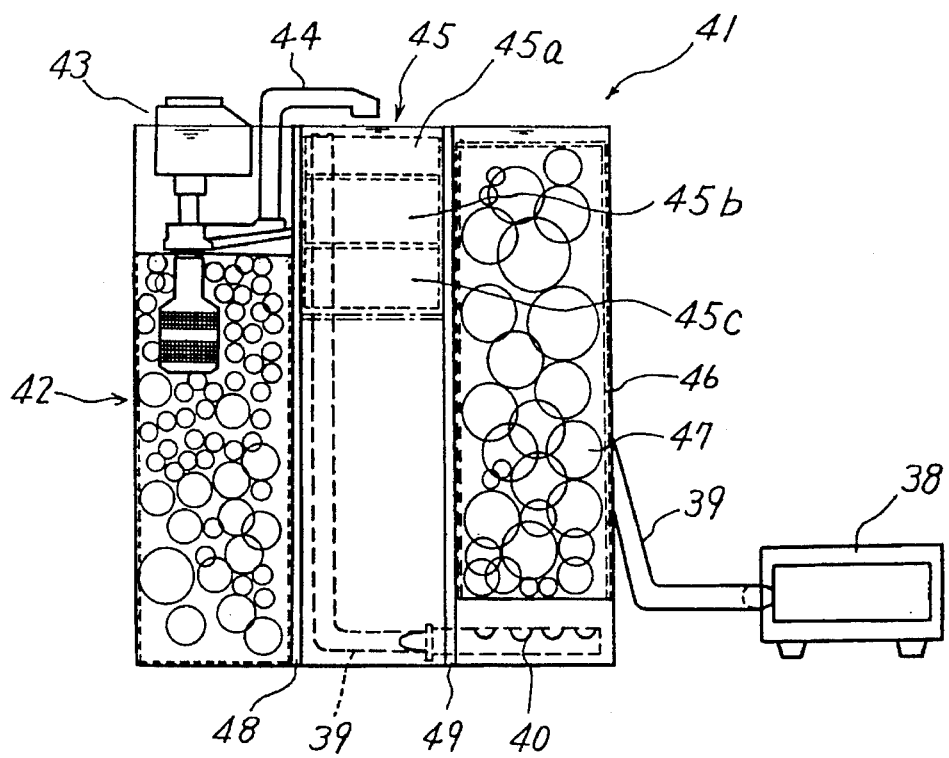
FIG. 7 is a sectional view taken along line B—B in FIG. 5.

As shown in FIG. 1 through FIG. 3, a dirty water treating apparatus 1 according to a first embodiment of the present invention has a cylindrical container or housing 2 having openings at its upper and lower ends. The container 2 houses therein a porous material 13 onto which aerobic bacteria are implanted. The container 2 is provided with a plurality of legs 2a arranged at predetermined intervals along the peripheral surface of the container 2. A flanged upper cap 5 having an air outlet 6 is attached to the upper opening 3 of the container 2. In detail, the smaller diameter portion of the upper cap 5 has a cylindrical depression formed from the lower end thereof and is formed with four holes 5a, two of which are provided on one side (front side as viewed in FIG. 3) of the center of the cap 5, and remaining two are provided on the other side (back side as viewed in FIG. 3) of the center of the cap 5 (the holes on the back side are not illustrated). Also, four holes 2b are formed at the uppermost portion of the container 2, two of which are provided on the front side of the container 2, and the remaining two are provided on the back side of the container 2 (the holes on the back side are not shown). The cap 5 is attached to the upper opening 3 of the container 2 such that the holes 2b of the container 2 are aligned with the holes 5a of the upper cap 5. Subsequently, a U-shaped stopper wire 4 is inserted into the holes so that both ends of the stopper wire 4 project from the container 2 to the back side thereof. Both ends of the stopper wire 4 are then bent along the outer surface of the container 2. The upper cap 5 is fixed to the container 2 in the above-described manner.

The cylindrical container 2 is thereafter turned upside down, and the porous material 13 is placed into the container 2 whose one end has already been closed by the upper cap 5. A lower cap 8 is then attached to the lower opening (not illustrated) which is presently located at the upper side. Another U-shaped stopper wire 10 is inserted into four holes 2c formed at the lower end of the container 2, two of which are provided on one side, i.e., on the front side, and remaining two are provided on the other side, i.e., on the back side of the container 2 (the holes on the back side are not shown). Both ends of the stopper wire 10 are then bent along the outer surface of the container 2.

The container 2 is again turned upside down to return to its original posture. In this state, the lower cap 8 is supported by the U-shaped stopper wire 10 at the lower end of the container 2. The lower cap 8 is formed with a plurality of holes 9, and a connection hole 11 is formed at the lower end of the container 2. A hose 12 (shown in FIG. 1) is connected to the connection hole 11 for supplying air.

Air supplied from the hose 12 is led into the interior of the container 2 via the connection hole 11 and the holes 9, hereby bacteria implanted onto the porous material 13 are activated. The air is released from the container 2 through the air outlet 6 of the upper cover 5.

The porous material 13 is foamed glass, pumice or feldspar.

Preferred examples of the bacteria include Nitrobacter, Nitrosomonas and MD germ.

The above-described dirty water treating apparatus 1 is placed in an aquarium, as shown in FIG. 4. Air is fed from an air compressor 16 to the dirty water treating apparatus 1 via the hose 12 so that aerobic bacteria in the porous material packed in the dirty water treating apparatus 1 are activated.

Numeral 21 denotes another dirty water treating apparatus equipped with a suction pump. The dirty water treating apparatus 21 is composed of a cylindrical container 22 having legs 22a disposed at predetermined intervals around its circumference, a lower cap and an upper cap 25, thereby forming an inner space for packing a porous material therein. A hole formed in the upper cap 25 is connected to a suction pump 29 for pumping up water from the interior of the container 22. Water is then fed to a physical filter 31 having layers of an unwoven fabric or a sponge, via a drainpipe 30. Filtered water is returned to the tank. Further, water is replenished through a water supply pipe 15 when needed. The dirty water treating apparatus continuously cleans water, thereby providing an environment suitable for fish.

When a tank is large, a plurality of dirty water treating apparatuses are disposed in the tank, strayed in the longitudinal direction.

Second Embodiment

A second embodiment of the present invention will now be described with reference to FIG. 5 through FIG. 8.

Figure 8:
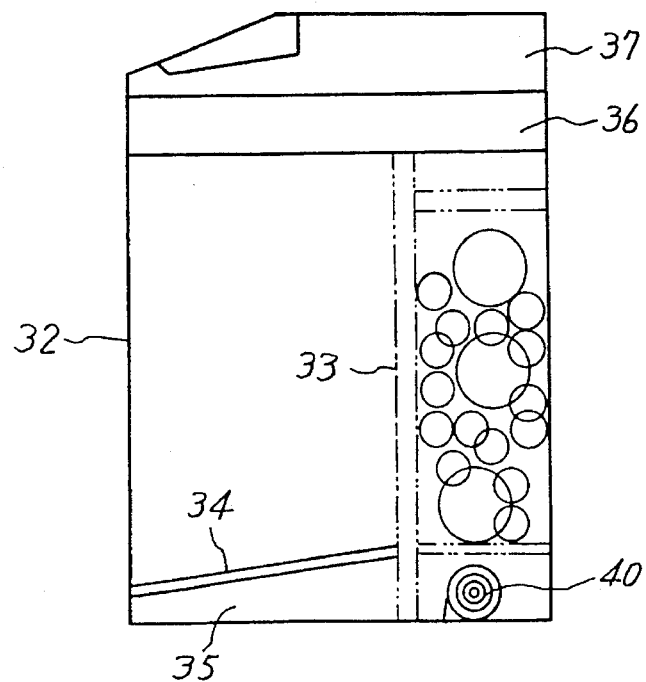
FIG. 8 is a sectional view taken along line C—C in FIG. 5.

Numeral 32 denotes a transparent tank made of acrylic resin. The tank 32 is provided with a floor plate 34, a lower cover 35, a ceiling plate 36, an upper cover 37, and a partition 33 for concealing a dirty water treating unit 41, as best shown in FIG. 8. The dirty water treating unit 41 is composed of a first dirty water treating apparatus 42, a physical filter 45 and a second dirty water treating apparatus 46. The first dirty water treating apparatus 42 houses a porous material and is equipped with a suction pump 43 having a drainpipe 44. The physical filter 45 has three layers, i.e., a layer 45a of an unwoven fabric, a layer 45b of activated carbon and a layer 45c of a sponge. The second dirty water treating apparatus 46 houses a porous material 47 onto which bacteria are implanted. Numeral 48 denotes a partition between the first dirty water treating apparatus 42 and the physical filter 45, while numeral 49 denotes a partition between the physical filter 45 and the second dirty water treating apparatus 46. Numeral 38 denotes an air compressor which supplies air to an air supply pipe 40 provided in the second dirty water treating apparatus 46 via a hose 39.

The dirty water treating unit 41 having the above-described structure is so compact that it can be disposed at the rear side of the tank as concealed by the partition 33.

When the suction pump 43 is in operation, water is sucked from the tank 32 in to the first dirty water treating apparatus 42 through suction openings 33a (shown in FIG. 6), and is cleaned therein. Water is then pumped up and discharged through the drainpipe 44. Water discharged from the drainpipe 44 is filtered by the physical filter 45 having the layer 45a of an unwoven fabric, the layer 45b of activated carbon and the layer 45c of a sponge, and is then returned to the tank through discharge openings 33d and 33e. Further, water in the tank 32 flows into the second dirty water treating apparatus 46 through inlet openings 33b, and is cleaned therein. Water is then returned to the tank through the discharge openings 33c. Since the air supply pipe 40, to which air is supplied by the air compressor 38, is disposed at the bottom of the second dirty water treating apparatus 46, air is continuously supplied to bacteria in the porous material 47 so that the bacteria are activated.

Figure 9:
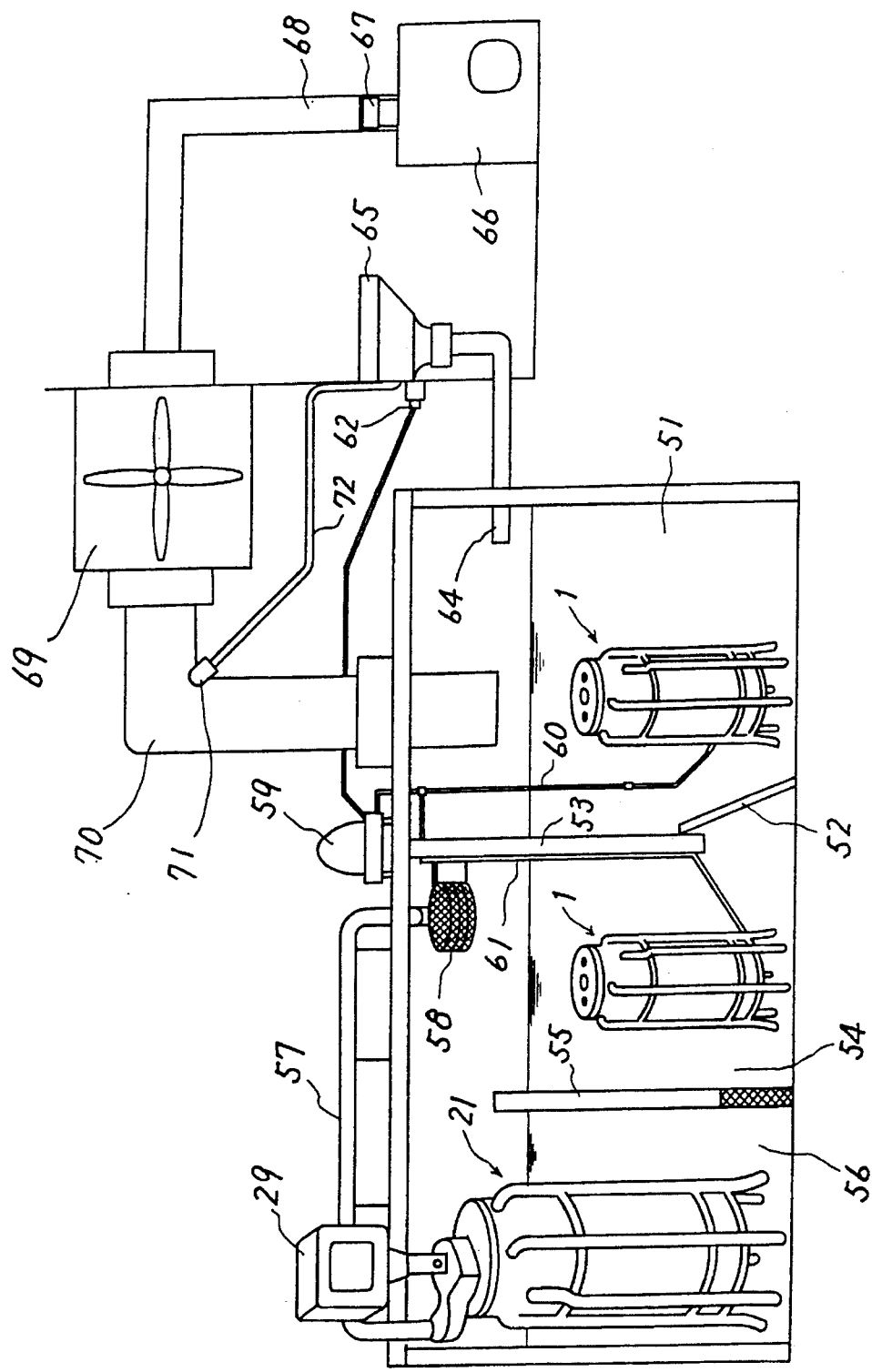
FIG. 9 is a view showing the overall structure of a dirty water treating facility for treating dirty water, smoke and nasty odors simultaneously, in which the dirty water treating apparatus according to the first embodiment is used.

A dirty water treating facility shown in FIG. 9 is arranged such that smoke and nasty odors are dissolved in water by the use of a sprinkler, and the water is thereafter fed to a septic tank for treatment. In detail, smoke and nasty odors produced in a furnace 66 are fed to a ventilator 69 through an exhaust outlet 67 and a chimney 68. A sprinkler 71 is disposed in the vicinity of the outlet of the ventilator 69. The sprinkler 71 is connected to a water supply system via a pipe 72. Very small water droplets formed by the sprinkler 71 catch smoke and odors, and the particles are introduced to a first tank section 51 via an exhaust pipe 70.

Sewage discharged from a drainpipe 64 connected to a washstand 65 or the like is also fed to the first tank section 51.

Dirty water fed into the septic tank 51 is cleaned by a first dirty water treating apparatus 1 having the structure shown in FIG. 1, and cleaned water then flows through a mesh plate 52 of a partition 53 into a second tank section 54 in which water is further cleaned by a second dirty water treating apparatus 1 having the structure shown in FIG. 1. Subsequently, water flows through a meshed portion of a partition 55 into a third tank section 56 in which water is further cleaned by a third dirty water treating apparatus 21 having the structure shown in FIG. 4. The third dirty water treating apparatus 21 is provided with a suction pump 29 and a discharge pipe 57. Water dischared from the discharge pipe 57 is passed through a physical filter 58 having layers of an unwoven fabric, activated carbon and a sponge, and is returned to the second tank section 54 for circulation.

This dirty water treating facility requires an electric power source for driving the air compressor 59. Its the electric power source, commercial electric power source can be used. Its shown in FIG. 9, AC power is obtained from a wall outlet 62 and is supplied to the air compressor 59 for driving the air compressor 59. Air is supplied to the first and second dirty air treating apparatuses 1 via pipes and 61.

Third Embodiment

A third embodiment of the invention will now be described with reference to FIGS. 10 and 11.

A dirty water treating apparatus according to this embodiment includes a lower container 118 and an upper container 117a which has a structure of net or wire basket.

A porous material 119a is packed in the upper container 117a and aerobic bacteria are implanted on the porous material 119a. An air supply pipe 103 is disposed in the lower container 118 to penetrate the lower container 118 in the longitudinal direction. The air supply pipe 103 is formed with a plurality of air discharge holes 105, and an external thread 114 is formed at the leading end of the air supply pipe 103. Similarly, another external thread 104 is formed in the vicinity of the other end or trailing end of the air supply pipe 103. The air supply pipe 103 is inserted into the lower container 118 such that the leading end and tailing end of the air supply pipe 103 project from respective longitudinal sides of the lower container 118.

A blind nut 116 having a ring 115 is screwed onto the external thread 114 on the leading end of the air supply pipe 103. Similarly, a nut 101 is screwed onto the external thread 104 on the trailing end of the air supply pipe 103 with a washer 102 being interposed between the nut 101 and the lower container 118 so that the longitudinal position of the air supply pipe 103 is fixed with respect to the lower container 118. Further, two metal rings 106 and 110 are fixed to the air supply pipe 103, and two fix bars 107 and 111 are passed through the metal rings 106 and 110, respectively. Both end portions of the fix bar 107 are formed with external threads 108a and 108b, respectively, while both end portions of the fix bar 111 are formed with external threads 112a and 112b, respectively. When the fix bars 107 and 111 are inserted into the lower container 118, the fix bars 107 and 111 penetrate the rings 106 and 110, and both their ends project from both transverse sides of the lower container 118. Nuts 109a and 109b each having a ring are screwed onto the external thread 108a and 108b of the fix bar 107, and nuts 113a and 113b each having a ring are screwed onto the external thread 112a and 112b of the fix bar 111. With this assembly, the radial direction of the air supply pipe 103 is fixed with respect to the lower container 118.

Figure 10:
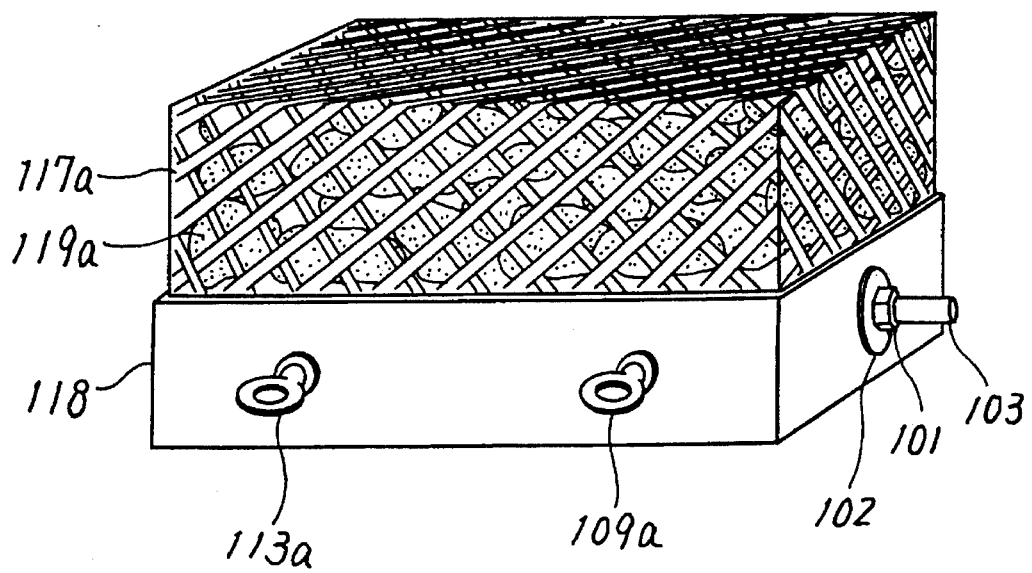
FIG. 10 is a perspective view showing a dirty water treating apparatus according to a third embodiment of the present invention.
Figure 11:
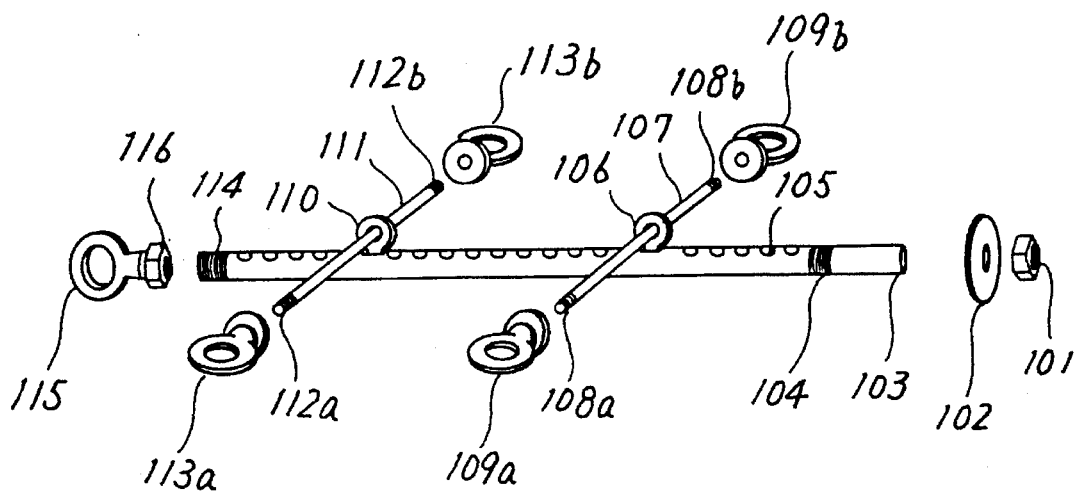
FIG. 11 is an exploded view of an air supply pipe used in the dirty water treating apparatus shown in FIG. 10.

As shown in FIG. 10, the container has a rectangular shape, and part of the container is formed by the upper container 117a having a structre of net or wire basket. In order to clean dirty water, dirty water is passed through the porous material 119a using a suction pump or a discharge pump. Further, an air compressor is connected to the trailing end of the air supply pipe 103.

Fourth Embodiment

Figure 12:
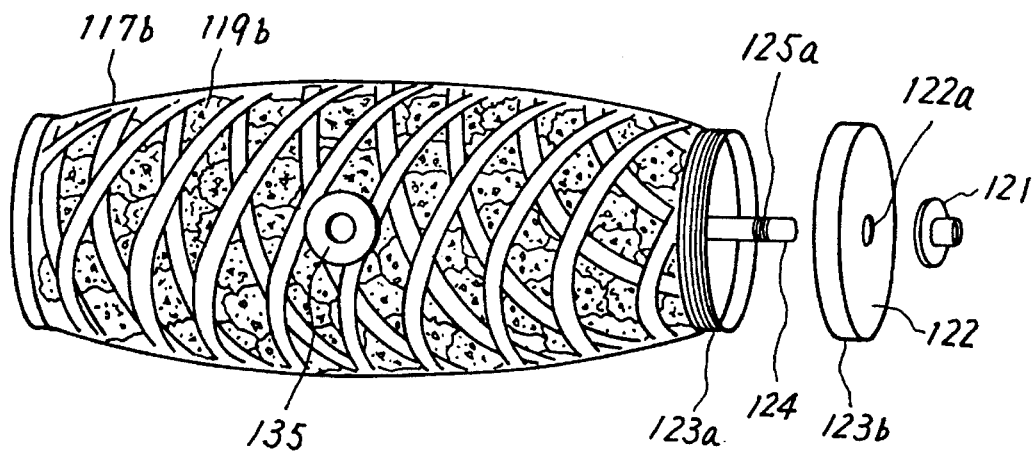
FIG. 12 is a perspective view showing a dirty water treating apparatus according to a fourth embodiment of the present invention.
Figure 13:
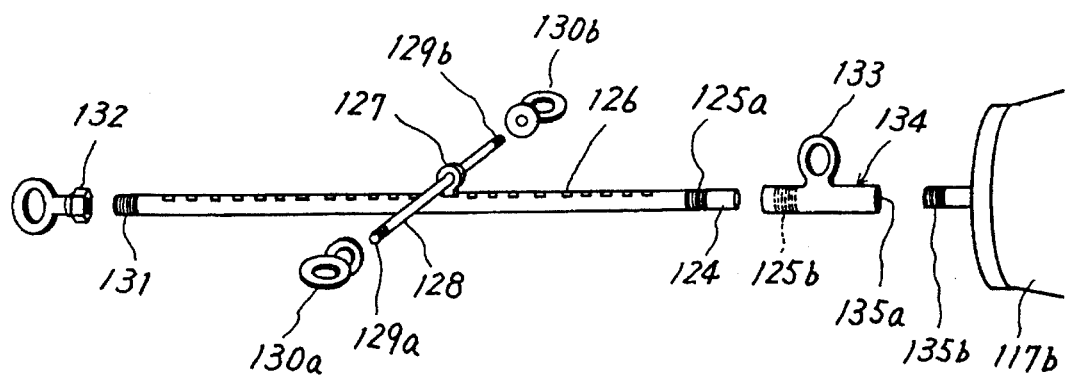
FIG. 13 is an exploded view of an air supply pipe used in the dirty water treating apparatus shown in FIG. 12.

A fourth embodiment of the invention will now be described with reference to FIGS. 12 and 13.

A dirty water treating apparatus according to this embodiment includes a cylindrical basket-like container 117b, in which a porous material 119b is packed. Aerobic bacteria are implanted on the porous material 119b. To supply air into the container 117b, an air supply pipe 124 is provided which penetrates the container 119b in the longitudinal direction. The air supply pipe 124 is formed with a plurality of air discharge holes 126, and an external thread 131 is formed at the leading end of the air supply pipe 124. Similarly, another external thread 125a is formed in the vicinity of the tailing end of the air supply pipe 124. The leading end and tailing end of the air supply pipe 124 project from respective ends of the container 117b after being inserted into the container 117b. At the right-side end of the container 117b as viewed in FIG. 12, an external thread 123a is formed on its periphery, and a cap 122 having an internal thread 123b is screwed on to the external thread 123a The cap 122 is formed at its center with a hole 122a through which the tailing end of the air supply pipe 124 passes.

A blind nut 132 having a ring is screwed onto the external thread 131 on the leading end. Similarly, a joint part 134 with a ring 133 having an internal thread 125b at its leading end is screwed onto the external thread 125a on the trailing end of the air supply pipe 124. The joint part 134 is provided with a ring and another internal thread 135a at its tailing end. The leading end of an air supply pipe of an adjacent basket-like container 117b can be connected to the joint part 134 by screwing the adjacent air supply pipe having an external screw 135b into the tailing end of the joint part 134. In this manner, a serial connection of a plurality of dirty water treating apparatuses is established.

In the case where the basket-like container 117b is used alone, the stopper nut 121 (shown in FIG. 12) is screwed on to the external thread 125a of the air supply pipe 124.

Further, a metal ring 127 is fixed to the air supply pipe 124, and a fix bar 128 is passed through the metal ring 127. A fix bar 128 passes through a through hole 135 of the basket-like container 117b. Both end portions of the fix bar 128 are formed with external threads 129a and 129b, respectively. After the fix bar 128 has been inserted radially through the container 117b nuts 130a and 130b, each having a ring, are screwed onto the external thread 129a and 129b of the fix bar 128. With this assembly, the radial direction of the air supply pipe 124 is fixed with respect to the container 117b.

The container having a basket-like shape is put into dirty water. Alternatively, dirty water is passed through the container. In the latter case, a suction pump or a discharge pump is used to force water to flow through the porous material 119b. In the case where only one container is used, an air compressor is connected to the trailing end of the air supply pipe 124, while the leading end of the air supply pipe 124 is closed using the blind nut 132. In the case where two or more containers are used, they are serially connected, and air is supplied to the tailing container.

Next, description will be given of examples of dirty water treating facilities, in which the dirty water treating apparatuses according to the third and fourth embodiments are used in combination.

Figure 14:
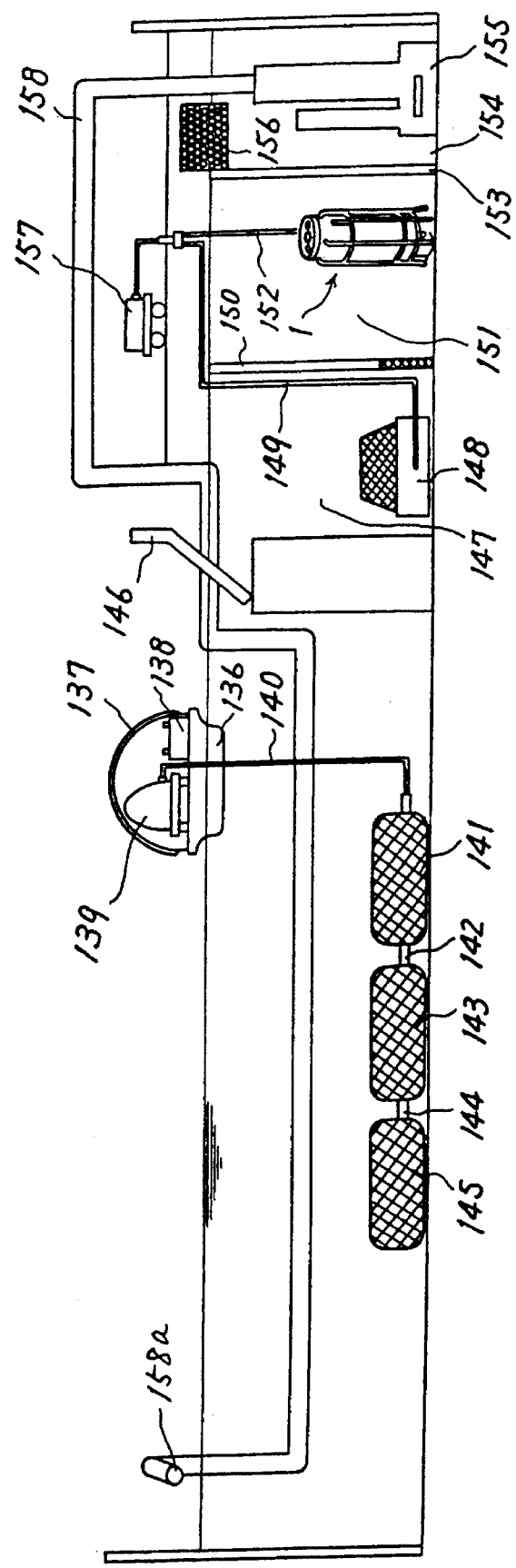
FIG. 14 is a view showing the overall structure of a dirty water treating facility for a pond in which dirty water treating apparatuses according to the present invention are used.

In the example shown in FIG. 14, a solar cell array 137 is provided on the surface of a pond using a floating base 136. Electric power generated by the solar cell array 137 is stored in a battery 138, and is converted to AC power by an unillustrated invertor. An air compressor 139 on the floating base 136 is connected to a basket-like dirty water treating apparatus 141 placed at the bottom of the pond through a pipe 140. The dirty water treating apparatus 141 has the structure shown in FIG. 12. When the compressor 139 is driven by AC power, air is supplied to bacteria in the dirty water treating apparatus 141. Air supplied through pipe 140 is also supplied to dirty water treating apparatuses 143 and 145 through joint parts 142 and 144. These dirty water treating apparatuses 143 and 145 also have the structure shown in FIG. 12. With this arrangement, activity of bacteria is improved, so that water is cleaned more effectively.

As described above, dirty water in the pond is cleaned by the serially connected dirty water treating apparatuses disposed at the bottom of the pond, and air is supplied from the air compressor 139 which is driven by the solar cell array 137 carried by the floating base 136.

In the pond, a water circulating system is provided. Water in the pond flows in to a water tank 147 through a trash collector 146 by which leaves and large trashes are removed. In the water tank 147, water is cleaned by a dirty water treating apparatus 148 having the structure shown in FIG. 10, and then flows into an adjacent water tank 151 under a through a partition 150. In the water tank 151, water is cleaned by a dirty water treating apparatus 1 having the structure shown in FIG. 1. Water flowing over a partition 153 passes through a physical filter 156 and is stored in a water tank 154, from which water is pumped up by a pump 155. Water is then introduced to the upstream side of the pond via a water supply pipe 158 so that water flows down from a return opening 158a of the pipe 158 into the pond. Here, air from the air compressor 157 is supplied to two branched pipes 149 and 152 which are connected to the dirty water treating apparatus 148, and the dirty water treating apparatus 1, respectively.

Figure 15:
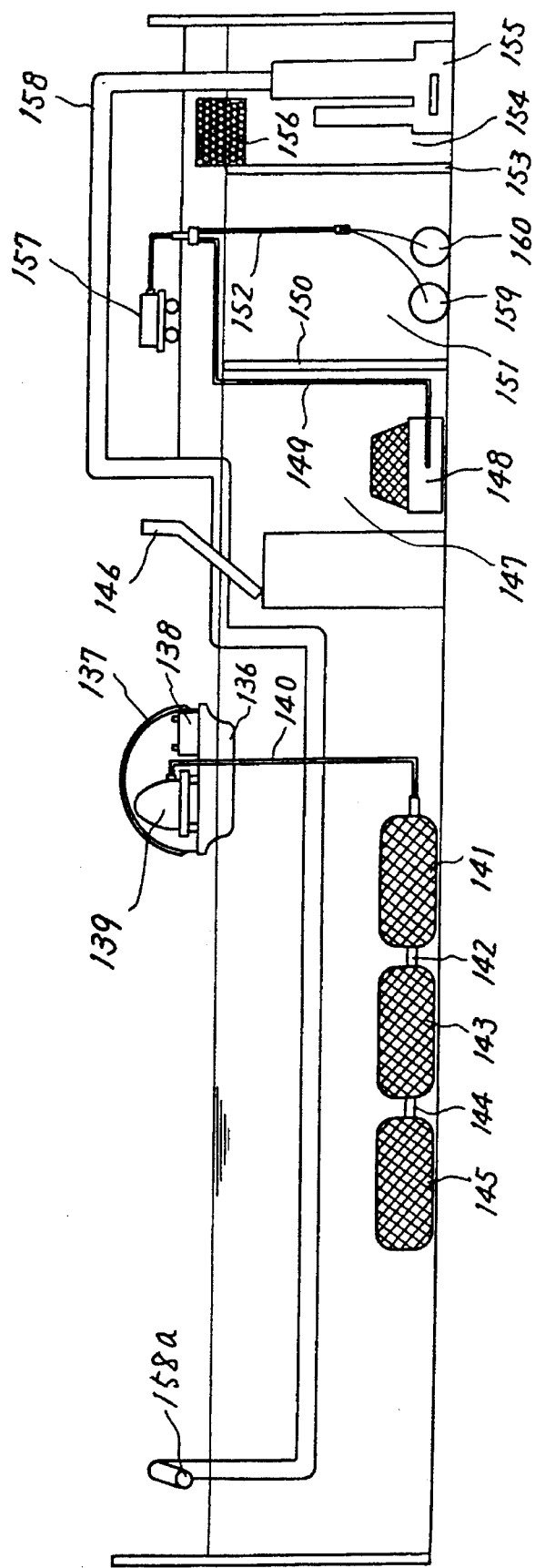
FIG. 15 is a view showing the overall structure of another dirty water treating facility for a pond in which dirty water treating apparatuses according to the present invention are used.

In the example shown in FIG. 15, basket-like dirty water treating apparatuses 159 and 160 are used instead of the dirty water treating apparatus 1 used in the example shown in FIG. 14.

Figure 16:
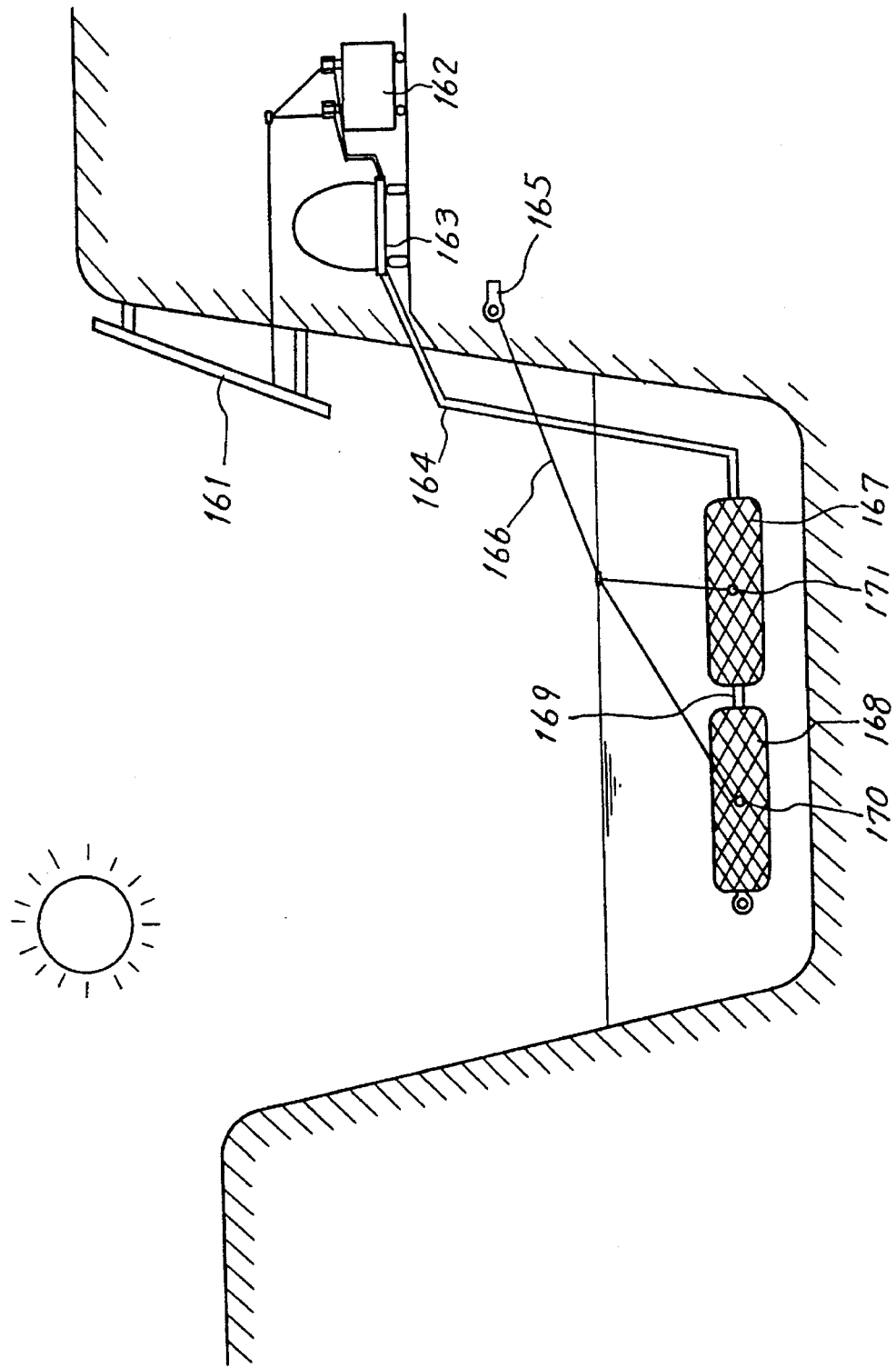
FIG. 16 is a view showing the overall structure of a dirty water treating facility for a river in which dirty water treating apparatuses according to the present invention are used.

In an example shown in FIG. 16, a solar cell array 161 is mounted on a bank of a river where sunbeams irradiate for a longer period of time compared to the opposite bank. Electricty generated by the solar cell array 161 is stored in a battery 162, and is converted to AC power by an unillustrated invertor. An air compressor 163 is connected to basket-like dirty water treating apparatuses 167 and 168 placed at the bottom of the river through a pipe 164. These dirty water treating apparatuses 167 and 168 have the structure shown in FIG. 12, and are connected with each other with a joint 169. To prevent the dirty water treating apparatuses 167 and 168 from being carried away by water in the river, the dirty water treating apparatuses 167 and 168 are anchored to the bank of the river with wires 166. In detail, wires 166 are connected at one end to the rings 170 and 171 fixed to the dirty water treating apparatuses 167 and 168 while the other ends of the wires 166 are connected to a hook 165 on a concrete wall in the bank.

Figure 17:
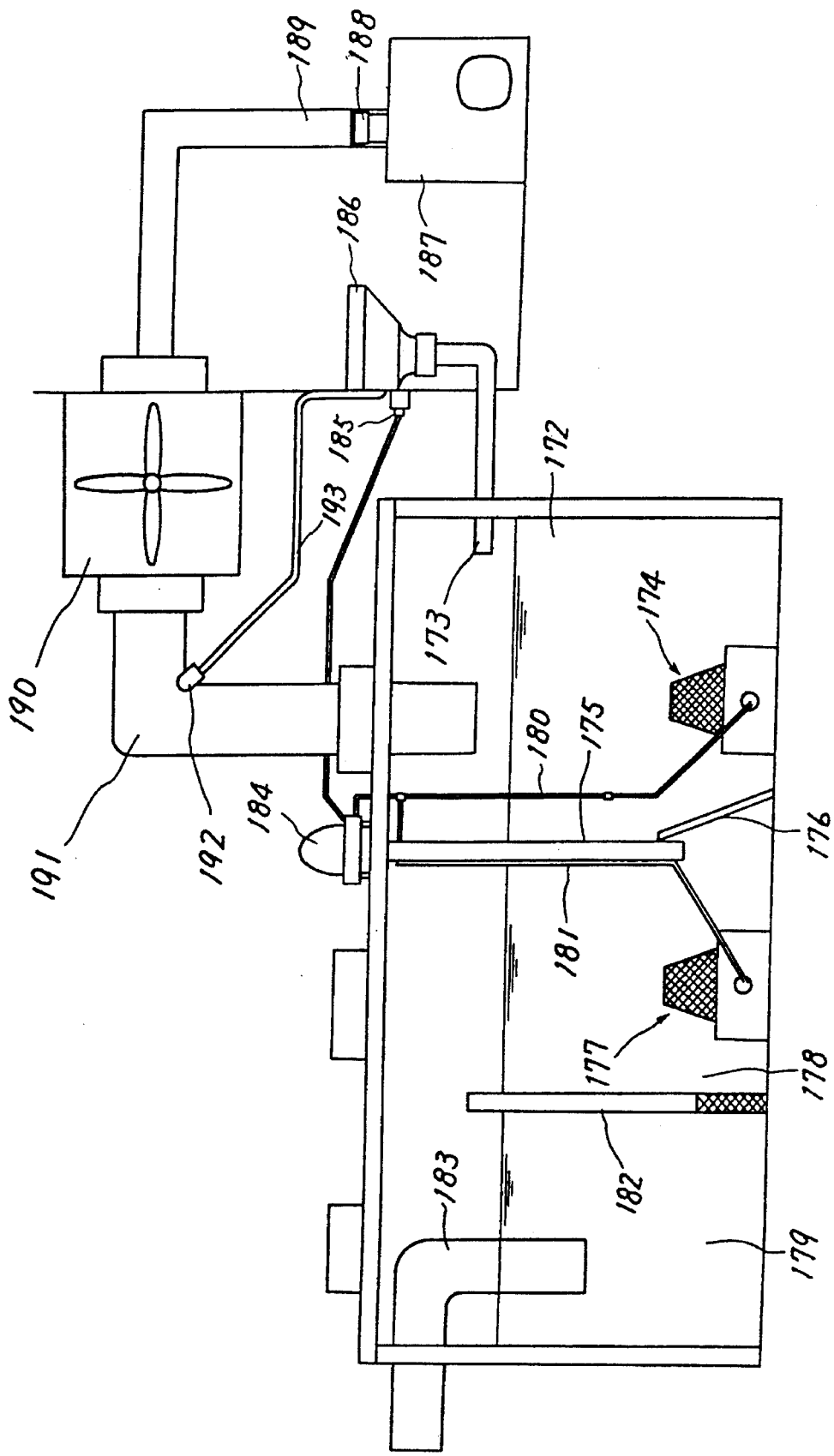
FIG. 17 is a view showing the overall structure of a dirty water treating facility for treating dirty water, smoke and nasty odors simultaneously, in which dirty water treating apparatuses according to the present invention are used.

A dirty water treating facility shown in FIG. 17 basically has the same structure as shown in FIG. 9. Namely, in the dirty water treating facility shown in FIG. 17, smoke and unagreeable odors are dissolved in water by the use of a sprinkler, and the water is thereafter introduced to a septic tank.

In detail, smoke and nasty odors produced in a furnace 187 are fed to a ventilator 190 through an exhaust outlet 188 and a chimney 189. A sprinkler 192 is disposed in the vicinity of the exit of the ventilator 190. The sprinkler 192 is connected to a water supply system via a pipe 193. Very small water droplets formed by the sprinkler 192 catch smoke and odors, and the droplets are fed to a first tank section 172 via an exhaust pipe 191.

Sewage discharged from a drainpipe 173 connected to a washstand 186 or the like is also fed to the first tank section 172.

Dirty water fed into the septic tank 172 is cleaned by a first dirty water treating apparatus 174 having the structure shown in FIG. 10, and cleaned water then flows through a mesh plate 176 of a partition 175 into a second tank section 178 in which water is further cleaned by a second dirty water treating apparatus 177 having the structure shown in FIG. 10. Subsequently, water flows through a mesh portion of a partition 182 into a third tank section 179. Satisfactory cleaned water in the third tank section 179 flows outside through a discharge pipe 183.

This dirty water treating facility requires a electric power source for driving the air compressor 184. As the electric power source, a commercial electric power source can be used. As shown in FIG. 17, AC power is supplied from a wall outlet 185 to the air compressor 184 for driving the air compressor 184. Air is supplied to the first and second dirty air treating apparatuses 174 and 177 via pipes 180 and 181.

When an electric power generating system with solar cells is combined with this facility, this facility can be used in areas where no commercial power source is available.

As shown in FIG. 18, DC power obtained by a solar cell array 194 is fed to an AC load 197 such as an air compressor via an invertor 195. When commercial power source 196 is used, AC power from the commercial power source 196 is supplied directly to the AC load 197.

In the example shown in FIG. 19, DC power obtained by a solar cell array 194 is fed to a battery 198 as well as an invertor 195. When DC power is excessively generated by the solar cell array 194, excessive power is charged into the battery 198. When DC power generated by the solar cell array 194 is not sufficient, the electricity is discharged from the battery 198 to drive the invertor 195 so that AC power is supplied to the AC load 197.

Obviously, numerous modifications and variations of the present invention are possible in light of the above teachings. It is therefore to be understood that within the scope of the appended claims, the present invention may be practiced otherwise than as specifically described herein.

What is claimed is:

1. A dirty water treating apparatus comprising:
   (a) a container having air permeability;
   (b) a porous material housed in said container and onto which aerobic bacteria are implanted;
   (c) dirty water passing means for passing dirty water through said porous material; and
   (d) air passing means for passing air through said porous material, said air passing means including an air supply pipe which penetrates said porous material and which is formed with air discharging holes, one end of said air supply pipe being closed and the other end of said air supply pipe being connected to an air compressor; and
   a solar generator operably connected for driving said air compressor.

2. A dirty water treating apparatus according to claim 1, wherein said container having air permeability is a cylindrical container.

3. A dirty water treating apparatus according to claim 1, wherein said container having air permeability is a rectangular container.

4. A dirty water treating apparatus according to claim 1, wherein said container having air permeability is a net or a basket.

5. A dirty water treating apparatus according to claim 1, wherein said dirty water passing means is a suction pump or a discharge pump.

6. A dirty water treating apparatus according to claim 1, wherein said porous material is foamed glass.

7. A dirty water treating apparatus according to claim 1, wherein said porous material is pumice.

8. A dirty water treating apparatus according to claim 1, wherein said porous material is feldspar.

9. A dirty water treating facility comprising:
   (a) a first dirty water treating apparatus including a first container immersed in the dirty water and having air permeability, a first porous material housed in said first container and onto which aerobic bacteria are implanted, first dirty water passing means for a passing dirty water through said first porous material, air passing means for passing air through said first porous material, said air passing means including an air supply pipe which penetrates said porous material and which is formed with air discharging holes, one end of said air supply pipe being closed and the other end of said air supply pipe being connected to an air compressor; and a solar generator operably connected for driving said air compressor; and
   (b) a second dirty water treating apparatus including a second container having air permeability, a second porous material housed in said second container and onto which aerobic bacteria are implanted, second dirty water passing means for passing dirty water through said second porous material, and a suction pump for circulating the dirty water; and
   (c) a physical filter arranged for filtering water discharged from said second dirty water treating apparatus.

10. A dirty water treating facility according to claim 9, wherein said dirty water is water from an aquarium.

11. A dirty water treating facility according to claim 9, wherein said dirty water is sewage.

12. A dirty water treating facility according to claim 9, wherein said dirty water is dirty water from a river, a lake or a marsh.

* * * * *

UNITED STATES PATENT AND TRADEMARK OFFICE
CERTIFICATE OF CORRECTION

PATENT NO.  : 5,527,453
DATED       : June 18, 1996
INVENTOR(S) : Hiroki HACHIMA It is certified that error appears in the above-indentified patent and that said Letters Patent is hereby corrected as shown below:

```
Col. 4, line 33, "hereby" should read --whereby--;
        line 50, after "cap" insert --28--; and
        line 62, delete "strayed" insert --arrayed--.
Col. 6, line 5, "Its" should read --As--;
        line 7, "Its" should read --As--; and
        line 10, delete "and" insert --60 and--.
Col. 7, line 17, "on to" should read --onto--;
        line 41, after "117b" insert a comma --,--.
Col. 8, line 20, "a" should read --and--.
```

Signed and Sealed this

Twenty-fifth Day of March, 1997

Attest:

BRUCE LEHMAN

*Attesting Officer*       *Commissioner of Patents and Trademarks*